United States Patent [19]

Suga et al.

[11] Patent Number: 5,583,568
[45] Date of Patent: Dec. 10, 1996

[54] SOLID STATE IMAGE PICKUP APPARATUS HAVING IMPROVED LUMINANCE CONTROL

[75] Inventors: Akira Suga, Tokyo; Kazuyuki Matoba; Takashi Sasaki, both of Yokohama; Mayumi Yamamoto, Tokyo, all of Japan

[73] Assignee: Canon Kabushiki Kaisha, Tokyo, Japan

[21] Appl. No.: 262,380

[22] Filed: Jun. 20, 1994

Related U.S. Application Data

[63] Continuation of Ser. No. 834,997, Feb. 14, 1992, abandoned, which is a continuation of Ser. No. 398,492, Aug. 25, 1989, abandoned.

[30] Foreign Application Priority Data

| Aug. 26, 1988 | [JP] | Japan | 63-211908 |
| Nov. 17, 1988 | [JP] | Japan | 63-288835 |
| Nov. 20, 1988 | [JP] | Japan | 63-322584 |
| Nov. 21, 1988 | [JP] | Japan | 63-295638 |

[51] Int. Cl.$^6$ .................................... H04N 9/07
[52] U.S. Cl. ............................ 348/234; 348/237
[58] Field of Search .................... 348/237, 234, 348/235, 254, 238, 278–280; H04N 5/235, 9/07, 9/73

[56] References Cited

U.S. PATENT DOCUMENTS

| 4,544,952 | 10/1985 | Pham Van Cang | 358/163 |
| 4,590,520 | 5/1986 | Frame et al. | 358/163 |
| 4,642,677 | 2/1987 | Takanashi et al. | 358/43 |
| 4,701,784 | 10/1987 | Matsuoka et al. | 358/163 |
| 4,752,821 | 6/1988 | Poetsch . | |
| 4,814,861 | 3/1989 | Hieda | 358/29 C |
| 4,825,293 | 4/1989 | Kobayashi et al. | 348/254 |
| 4,860,092 | 8/1989 | Hieda | 358/41 |
| 4,887,252 | 12/1989 | Miyakawa et al. | 358/162 |
| 4,896,207 | 1/1990 | Parulski | 358/41 |
| 5,267,028 | 11/1993 | Suga et al. | 348/237 |
| 5,283,634 | 2/1994 | Yamazaki et al. | 348/254 |

FOREIGN PATENT DOCUMENTS

| 63-31387 | 2/1988 | Japan | H04N 9/07 |

*Primary Examiner*—Kim Vu
*Attorney, Agent, or Firm*—Fitzpatrick, Cella, Harper & Scinto

[57] ABSTRACT

A solid state image pickup apparatus for obtaining a luminance signal from the average value of outputs of two or more pixels varying in spectral characteristic from line to line. It includes a circuit to correct the amplitude of a luminance signal in every other line such that the amplitude of the luminance signal in each line is constant in a uniform luminance face image pickup state. The circuit may automatically switch the amplitude of the luminance signal in accordance with a change in the color temperature.

25 Claims, 17 Drawing Sheets

FIG. 4
PRIOR ART

A FIELD:

n LINE:

LUMINANCE : $Y_n = (Mg + G)/2$

COLOR : $C_n = Mg - G$ n+1 LINE:

LUMINANCE : $Y_{n+1} = (Ye + Cy)/2$

COLOR : $C_{n+1} = Ye - Cy = R - B$

B FIELD:

n' LINE:

LUMINANCE : $Y_{n'} = (Mg + G)/2$

COLOR : $C_{n'} = G - Mg$ n+1' LINE:

LUMINANCE : $Y_{n+1'} = (Ye + Cy)/2$

COLOR : $C_{n+1'} = Cy - Ye = B - R$

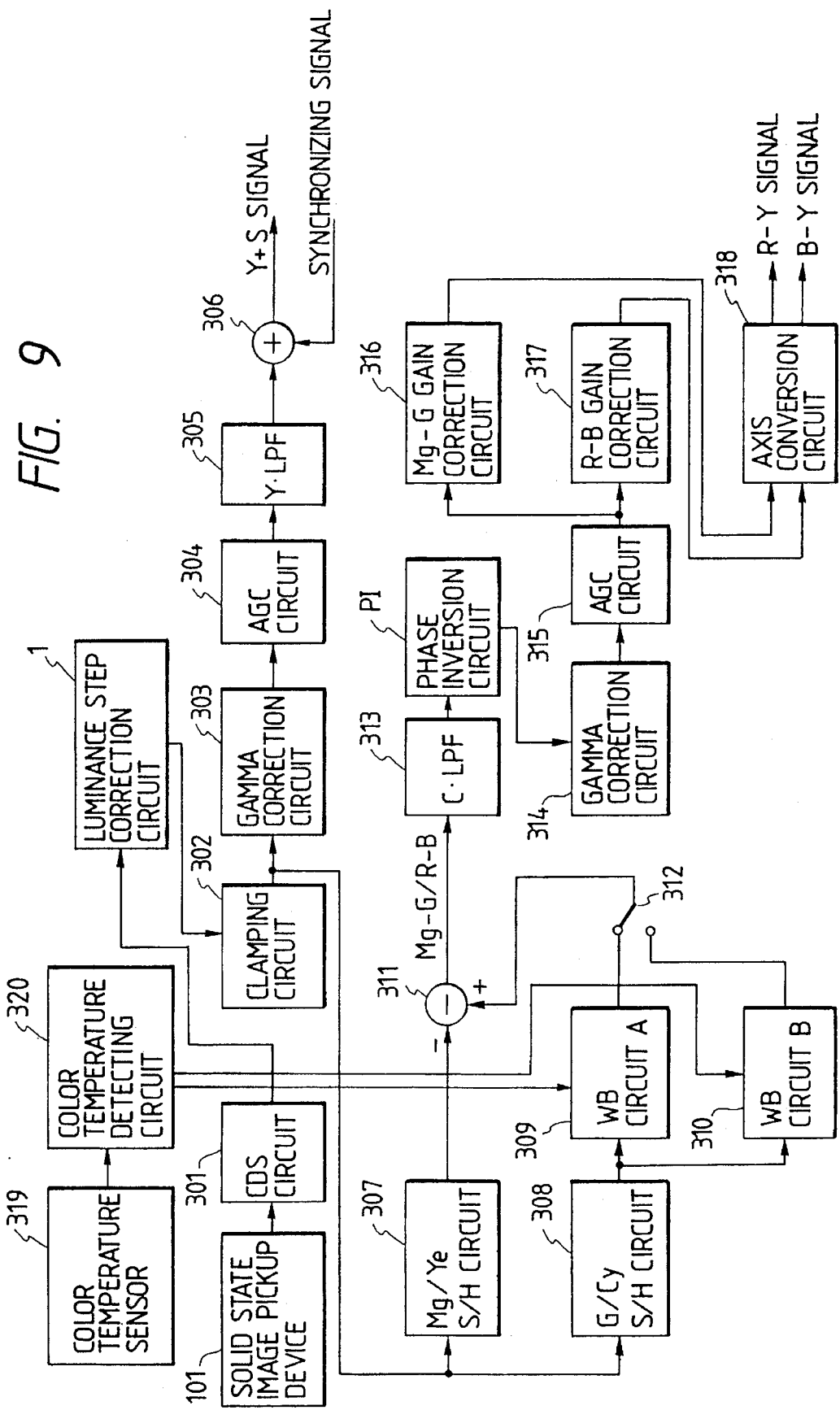

| Mg | Gr | Mg | Gr | |
|----|----|----|----|---|
| Cy | Ye | Cy | Ye | |
| Mg | Gr | Mg | Gr | |
| Ye | Cy | Ye | Cy | |
| | | | | |

SOLID STATE IMAGE PICKUP APPARATUS HAVING IMPROVED LUMINANCE CONTROL

This application is a continuation of application Ser. No. 07/834,997, filed Feb. 14, 1992, now abandoned, which is a continuation of application Ser. No. 07/398,492, filed Aug. 25, 1989, which is now abandoned.

BACKGROUND OF THE INVENTION

1. Field of the Invention

The present invention relates to solid state image pickup apparatus which electrically processes the signal photoelectrically converted by a solid state image pickup device, and which is suitable for an electronic still camera which records the signal as a still picture on a medium such as a magnetic sheet or disc.

2. Related Background Art

FIG. 1 illustrates an interline type CCD as one example of a solid state image pickup element used very often in an electronic still camera. In FIG. 1, reference numeral 101 denotes the interline type CCD as a solid state image pickup device; 102, photodiodes which convert light to electric charges and store them; 103, a vertical CCD which vertically transfers the electric charges received from the photodiodes, stage by stage, for each horizontal scanning interval; V1–V4, a transfer terminals for the vertical CCD in which V1 also functions as a transfer gating terminals to transfer electric charges in an odd number of lines of photodiodes to the vertical CCD and V3 also functions as a transfer gating terminals corresponding to an even number of lines of photodiodes. The vertical CCD is driven by four-phase transfer pulses applied to terminals V1–V4. Reference numeral 104 denotes a horizontal CCD which horizontally transfers the electric charges transferred from the vertical CCD 103 by one stage for each horizontal scanning period. H1 and H2 each denote a transfer terminal for the horizontal CCD and are driven by two-phase pulses. Reference numeral 105 denotes an output amplifier for converting electric charges to a voltage and outputting the voltage. Reference VOUT denotes an output terminal.

FIG. 2 shows the arrangement of color filters suitable for an electronic still camera. The n-th line includes alternating Mg (magenta) and G (green) filters; the (n+1)-th line includes alternating Ye (yellow) and Cy (cyan) filters. Mg, G and Ye, Cy are inverted in order of arrangement in each field as shown.

FIG. 3 shows the drive timing used for performing the frame reading of pixel information in the solid state image pickup device 101. The electric charges in the n-th line photodiode are transferred to the vertical CCD 103 by rendering V1 high at a time T1, and read between times T2 and T3. The electric charges in the n'-th line are transferred to the vertical CCD at a time T3 and read at a time T4. Thus, the electric charges corresponding to Ye, Cy, Mg and G are read separately pixel by pixel.

FIG. 4 illustrates a process for producing a luminance signal and a color signal from the read signals. As shown collectively in FIG. 4, the luminance signal (hereinafter referred to also as a Y-signal) is obtained from each line and color difference signals Mg-G or R-B are obtained line-sequentially from every other line.

FIG. 5 is a block diagram of an electronic still camera. Reference numeral 201 denotes a lens; 202, a diaphragm; 203, a shutter; and 204, a driving circuit for the shutter and diaphram. The solid state image pickup device 101 includes an interline type CCD, as mentioned above. Reference numeral 205 denotes an image pickup device driving circuit; 206, a clock generating circuit; 207, an image pickup signal processing circuit which processes the output of the image pickup device to obtain the luminance signal and the line-sequential color difference signals sequentially; 208, a frequency modulation circuit which frequency-modulates the luminance signal and the line-sequential color difference signals; 209, a REC amplifier which amplifies the frequency-modulated signal so as to enable magnetic recording; 210, a magnetic head; 211, a magnetic sheet as a recording medium; 212, a motor to drive the magnetic sheet; 213, a motor servo circuit; 214, a system control circuit which controls the operation of the whole system; 215, a shutter release switch which is turned on to start a still picture pickup sequence.

FIG. 6 is a block diagram of the image pickup signal processing circuit 207. Reference numeral 301 denotes a CDS circuit to eliminate noise from the solid state image pickup device 101; 302, a clamping circuit to clamp the output of the CDS circuit 301 to a constant DC level; 303, a gamma correction circuit to gamma correct the output of the clamping circuit 302; 304, an AGC circuit to adjust the gain of the output from the gamma correction circuit 303; 305, a luminance low pass filter (hereinafter referred as Y.LPF) which allows the passage of the luminance signal band alone; 306, an adder to add the synchronizing signal and the luminance signal to produce a luminance+synchronization (hereinafter referred to as Y+S) signal; 307, a sample and hold circuit to sample and hold the Mg or Ye signal; 308, a sample and hold circuit to sample and hold the G or Cy signal; 309, a white balancing circuit (hereinafter referred to as a WB circuit A) to correct the gain of the output from the sample and hold circuit 308 such that the color difference signal Mg–G corresponding to a white subject is nullified; 310, a white balancing circuit (hereinafter referred to a WB circuit B) to correct the gain of the output from the sample and hold circuit 308 such that the color difference signal R–B corresponding to a white subject is nullified; 319, a color temperature sensor to sense the color temperature of a light source; usually, two color (R and B) sensors or three color (R, G and B) sensors are used; 320, a color temperature detecting circuit which detects the color temperature from the output of the color temperature sensor 319 and determines the gain of the white balancing circuit; 312, a switch for switching between the output signals from the WB circuits A 309 and B 310 for each horizontal scanning interval; 311, a subtracting circuit to produce a color difference signal; 313, a low pass color filter (hereinafter referred to as a C.LPF) which allows the passage of a color signal band alone; PI, a phase inversion circuit; 314, a gamma correction circuit for the color signal; 315, an AGC circuit for the color signal; 316, a gain correction circuit for Mg–G; 317, a gain correction circuit for R–B; 318, an axis conversion circuit to convert color difference signals Mg–G and G–B to color difference signals R–Y and B–Y.

FIG. 7 illustrates a sequence for driving the electronic still camera. When the shutter release switch 215 is turned on at time T1, unnecessary electric charges in the A-field are cleared. Unnecessary electric charges in the B-field are then cleared at time T2 delayed by a time of one field interval. The shutter 203 is opened at time T3 to start exposure. The reading of the photodiode in the A-field is started at time T4, and the resulting signal is processed simultaneously and recorded as a still picture on the magnetic sheet 209. The reading of the photodiodes in the A-field is started at time T5 one field later than T4, and the resulting signal is processed simultaneously and recorded on the magnetic sheet 209 as a still picture. The next B-field signal D'" is recorded during a time of one field interval between T5 and T6.

When the luminance signal in the n-th line is made of Mg and G, and the luminance signal in the (n+1)-th line is made of Ye and Cy, it is very difficult to control the spectral characteristic of the color filters such that the values (Mg+G) and (Ye+Cy) coincide completely. Especially, such control is impossible with a colored object. Therefore, a phenomenon would occur in which luminance signals differ from line to line as shown in FIG. 8. This phenomenon is referred to as a luminance step and appears as a horizontal stripe on the screen to thereby impair the picture quality.

There is a method of averaging the vertical luminance signals by causing their vertical signal components to pass through a low pass filter in order to solve the problem. This method can solve the problem of the luminance step, but an image would be blurred in its portion containing many high frequency components.

SUMMARY OF THE INVENTION

It is an object of the present invention to provide an image pickup apparatus which solves the drawbacks of the conventional techniques and eliminates a luminance step or the like.

It is another object of the present invention to solve the problem and to provide an image signal processing apparatus which provides high image quality without a luminance step.

It is a further object of the present invention to provide a luminance signal processing apparatus which eliminates a luminance step without impairing the original image information.

In order to achieve these objects, an embodiment of the present invention solves the problem of the luminance step by providing means for changing the gain of the luminance signal in each line.

Another embodiment of the present invention controls a quantity of correction to the luminance step in accordance with a color signal processed. More particularly, the image signal processing apparatus is constituted so as to satisfy the following conditions (1)–(3), for example:

(1) The luminance signal level difference between horizontal scanning lines is corrected by a control signal produced in accordance with the color signal;

(2) Assume in the condition (1) that the color signals are color difference signals (R–Y) and (B–Y) and that the control signal includes a linear combination of the two color difference signals (R–Y) and (B–Y); and (3) Assume in the condition (1) that the color signals are color difference signals (R–Y) and (B–Y) and that the control signal is generated by table conversion of the two input color difference signals (R–Y) and (B–Y).

According to the structure satisfying the conditions (1)–(3), a fluctuation of luminance, or a luminance step, for each horizontal scanning interval produced by a change in the spectral reflectance of a subject is eliminated by correcting the level of the luminance signal.

In order to achieve such objects, another embodiment of the present invention is a luminance signal processor comprising:

image pickup means having a color separating filter attached thereto;

means for detecting vertical high frequency components of a signal obtained from the image pickup means; and frequency characteristic switching means for decreasing the vertical high-frequency components of the luminance signal obtained from the image pickup means when the high frequency components detected by the detecting means is lower than a predetermined level to thereby decrease the difference in luminance between horizontal line signals obtained from the image pickup means.

Thus, an averaged luminance signal is outputted in an area containing many low frequency components and in which the luminance step is relatively noticeable while the original luminance signal is outputted in an area containing many high frequency components and in which the luminance step is not noticeable to thereby eliminate the luminance step without impairing the original image information.

In order to achieve such objects, still another embodiment of the present invention is a luminance signal processor comprising:

image pickup means having a color separating filter attached thereto;

means for detecting vertical high-frequency components of a signal obtained from the image pickup means; and correcting means for performing an arithmetic operation between the signal from the image pickup means and the high-frequency components detected by the detecting means, and for processing the output in a non-linear manner to decrease a luminance step between horizontal line signals.

Thus, a luminance step correcting signal is outputted in an area containing many low frequency components and in which the luminance step is relatively noticeable while non-linear processing is performed such that the correcting signal is reduced and the original luminance signal is outputted in an area containing many high frequency components and in which the luminance step is not noticeable to thereby eliminate the luminance step without impairing the original image information.

Other objects and features of the present invention will be clear from the following description and the drawings.

BRIEF DESCRIPTION OF THE DRAWINGS

FIG. 4 illustrates a calculation process for providing a luminance signal and a color signal from output signals from a solid state image pickup device including the arranged color filters of FIG. 2;

FIG. 9 is a block diagram of a first embodiment of the present invention;

DETAILED DESCRIPTION OF THE PREFERRED EMBODIMENTS

Figure 10:
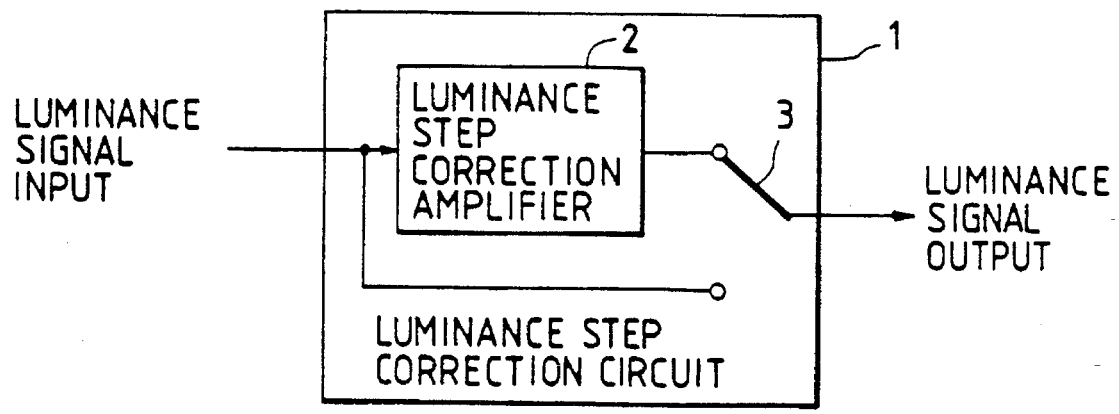
FIG. 10 is a block diagram of a luminance step correction circuit.

FIG. 9 is a block diagram of a signal processing circuit of a first embodiment of the present invention. In FIG. 9, reference numeral 1 denotes a luminance step correction circuit. FIG. 10 is a block diagram of an example of the luminance step correction circuit 1. In FIG. 10, reference numeral 2 denotes a luminance step correction amplifier; 3, a switch for switching for each line between the input original luminance signal and version of the luminance signal which is obtained by multiplying the original signal by a constant a by the luminance step correction amplifier. For example, when the image of a uniform luminance face is picked up, the constant a is selected such that a×Yn equals to Yn+1, and that the switch 3 is switched automatically for each line such that the luminance step correction amplifier 2 is selected for an n-th line and that the route in which the amplifier 2 is not included is selected for an (n+1)-th line.

Figure 11:
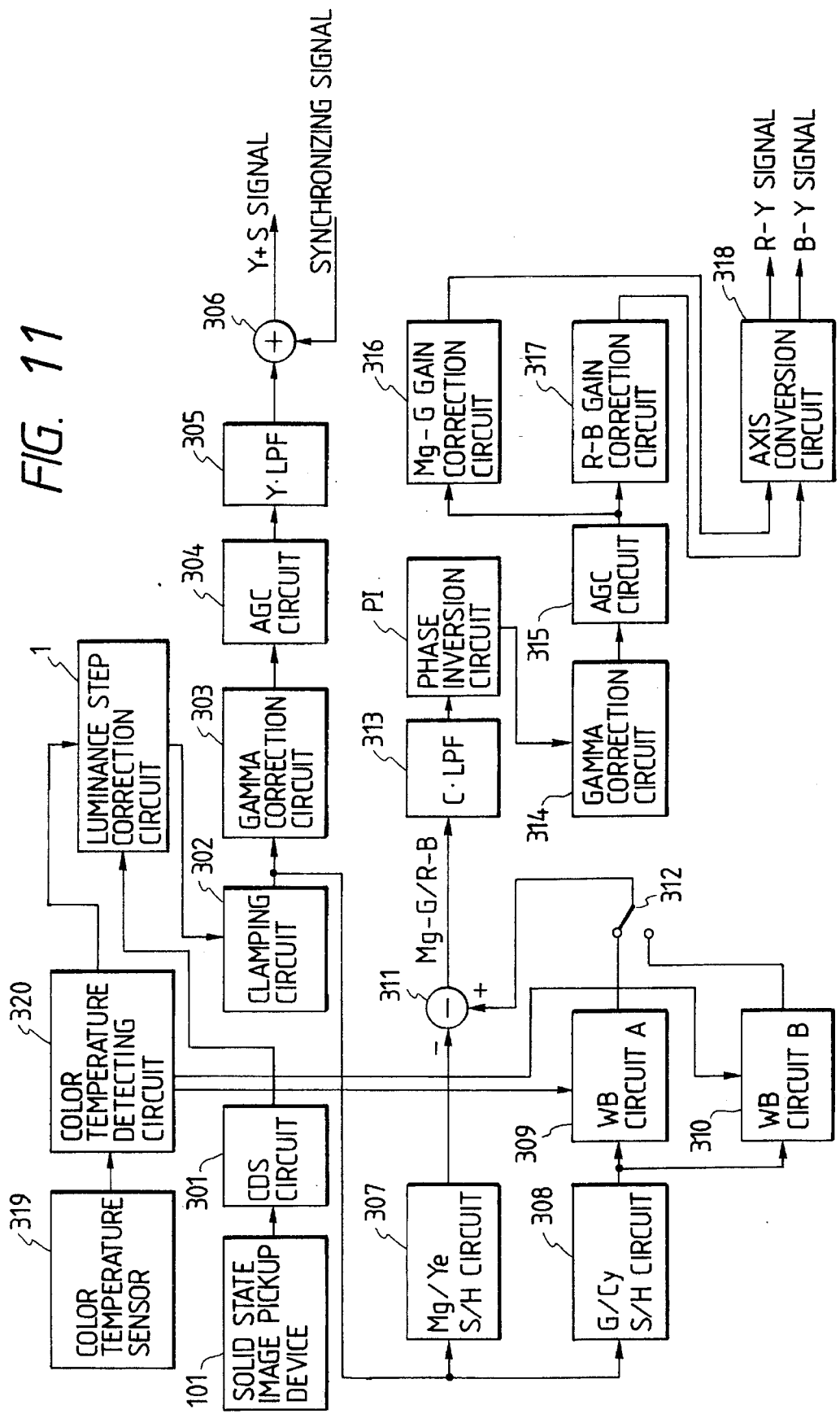
FIG. 11 is a block diagram of a second embodiment of the present invention.
Figure 12:
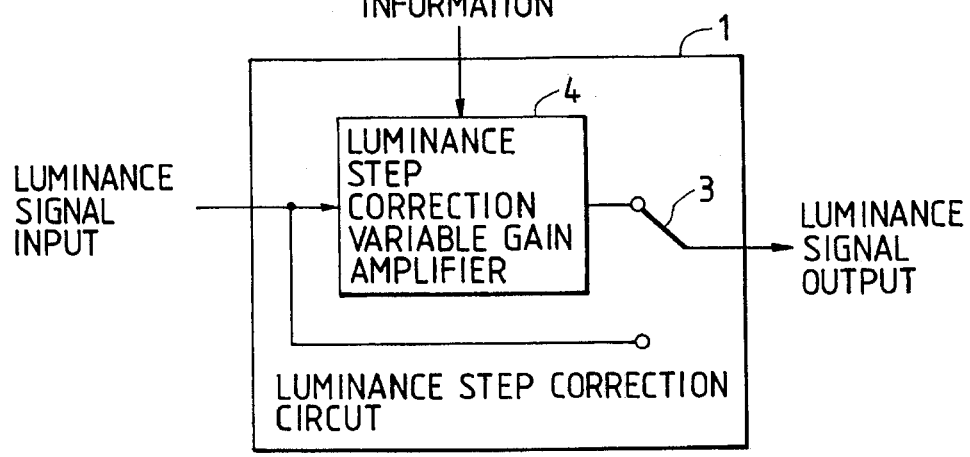
FIG. 12 is a block diagram of a luminance step correction circuit in the second embodiment.

FIG. 11 is a block diagram of a second embodiment in which a coefficient of correction for a luminance step is selected automatically in accordance with the color temperature of a light source to thereby suppress the luminance step efficiently. FIG. 12 illustrates the structure of the luminance step correction circuit of FIG. 11. Reference luminance 4 denotes a variable gain amplifier for correcting the luminance step and is constructed such that its gain is selected in accordance with the output from a color temperature detecting circuit 320. Luminance step can be suppressed effectively in a wide-range light source even if a quantity of luminance step may change depending on the color temperature of the light source.

As described above, according to the first and second embodiment, the phenomenon "luminance step" is suppressed using means which changes the gain of the luminance signal for each line in a solid state image pickup apparatus which extracts the luminance signal from a solid state image pickup device in which the spectral characteristics of color filters producing the luminance signal vary from line to line. Excellent suppression effects is produced in a wide-range light source by using a structure in which a quantity of correction of the light step is changed in accordance with a change in the color temperature.

Of course, the present invention produces similar effects for a moving picture as well.

Figure 13A:
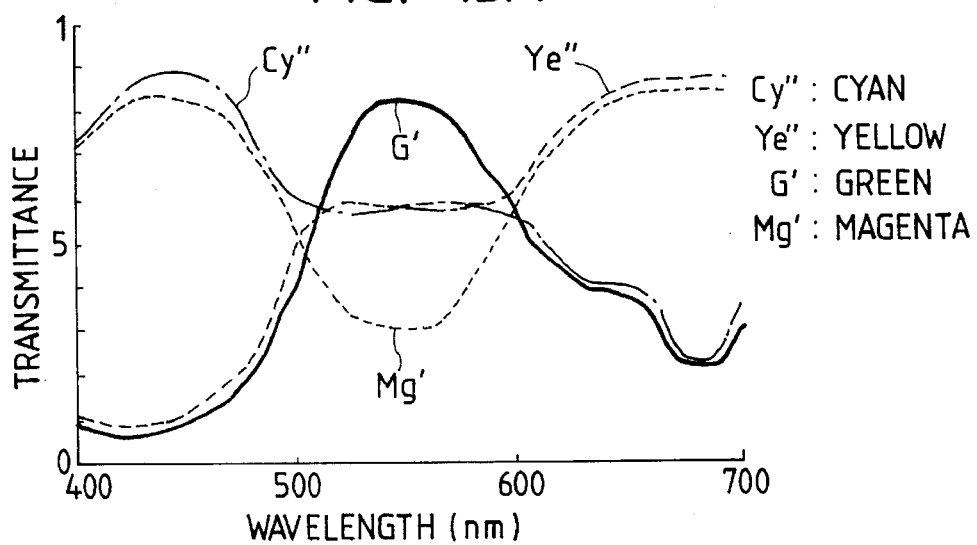
FIG. 13A illustrates the spectral characteristics of the color filters of FIG. 2.
Figure 13B:
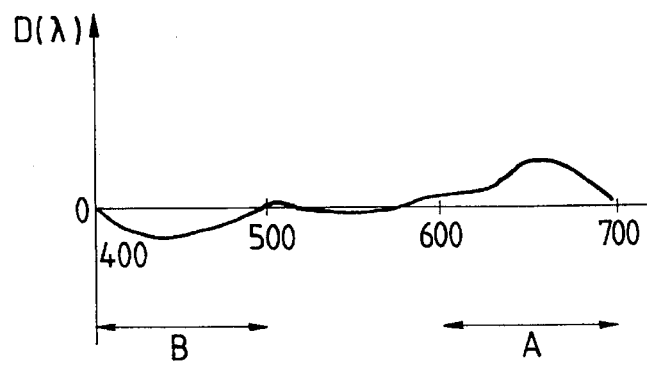
FIG. 13B illustrates the characteristic step of color filters.
Figure 13C:
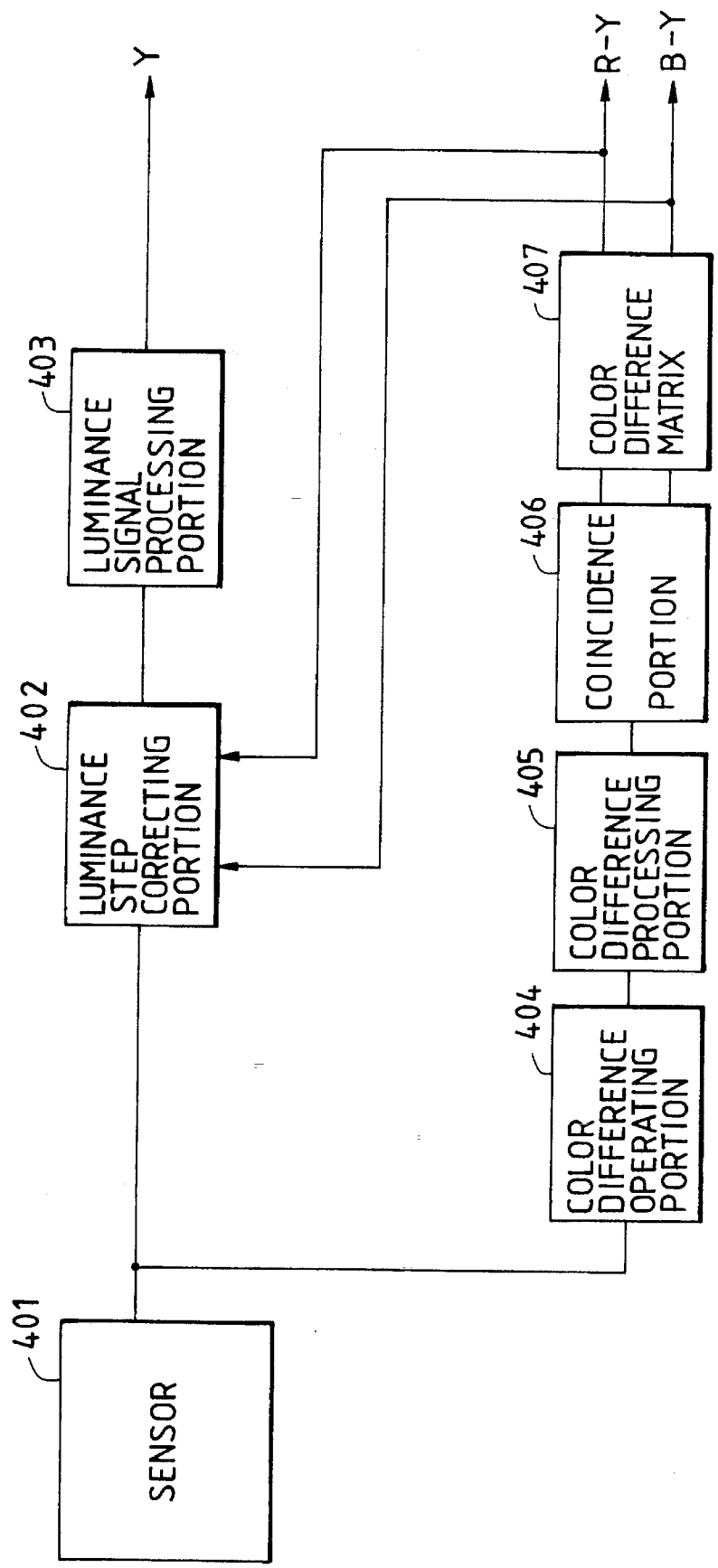
FIG. 13C is a block diagram of a third embodiment of the present invention.

FIGS. 13A, 13B and 13C illustrate a third and a fourth embodiment of the present invention and there principles will be outlined below.

$$Y_{2N+1} = \frac{1}{2} \int_{\lambda_1}^{\lambda_2} S(\lambda)[Mg(\lambda) + Gr(\lambda)] \, d\lambda \quad (1)$$

$$Y_{2N} = \frac{1}{2} \int_{\lambda_1}^{\lambda_2} S(\lambda)[Cy(\lambda) + Ye(\lambda)] \, d\lambda$$

where $S(\lambda)$ is the spectral reflectance of the light reflected from a subject, and $Mg(\lambda)$, $Gr(\lambda)$, $Cy(\lambda)$ and $Ye(\lambda)$ are the respective spectral sensitivities of color filters on the CCD. Therefore, $$Y_{2N+1} - Y_{2N} = \frac{1}{2} \int_{\lambda_1}^{\lambda_2} S(\lambda) D(\lambda) \, d\lambda \quad (2)$$

where $$D(\lambda) = Mg(\lambda) + Gr(\lambda) - Cy(\lambda) - Ye(\lambda) \quad (3)$$

Figures 1, 2:
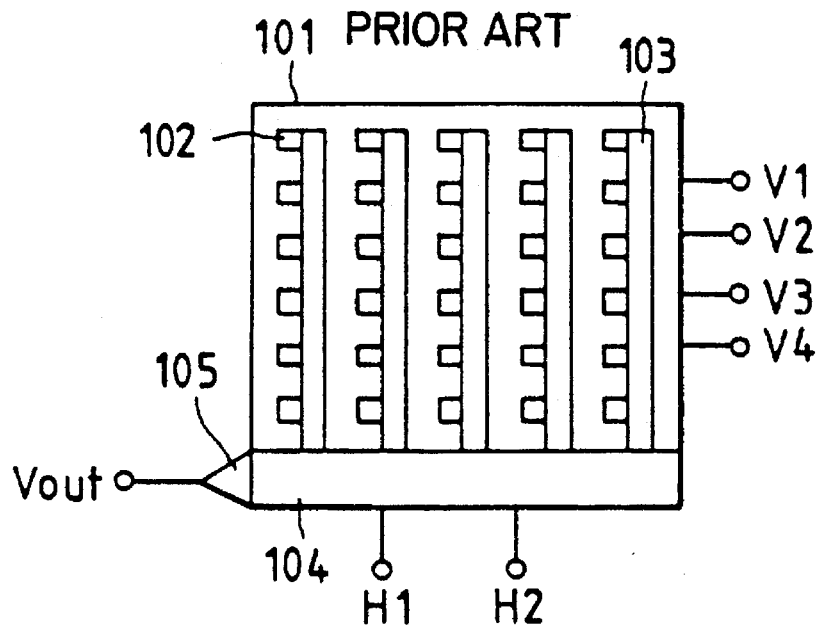
FIG. 1 illustrates an interline type CCD as one example of a solid state image pickup device used often in an electronic still camera.
FIG. 2 illustrates the arrangement of color filters suitable for an electronic still camera.
Figure 3:
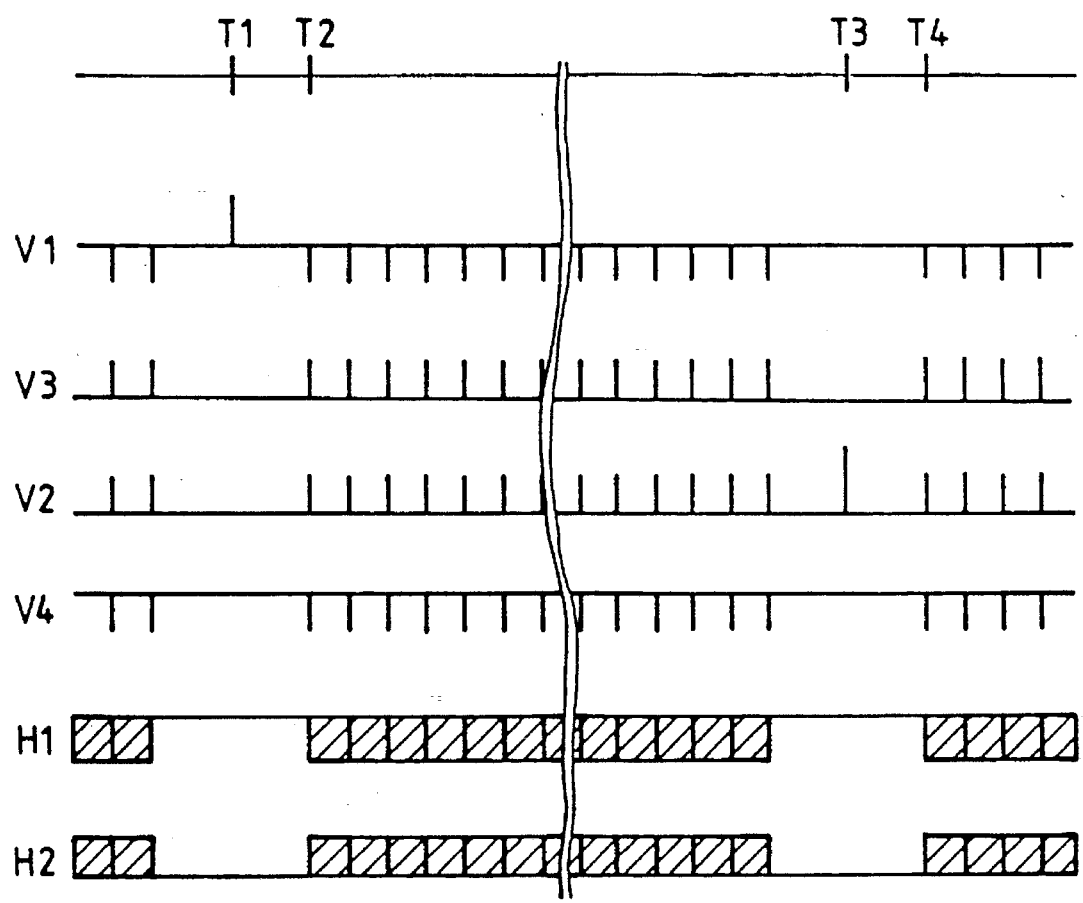
FIG. 3 illustrates drive timing for reading electric charges from a CCD 101.
Figure 5:
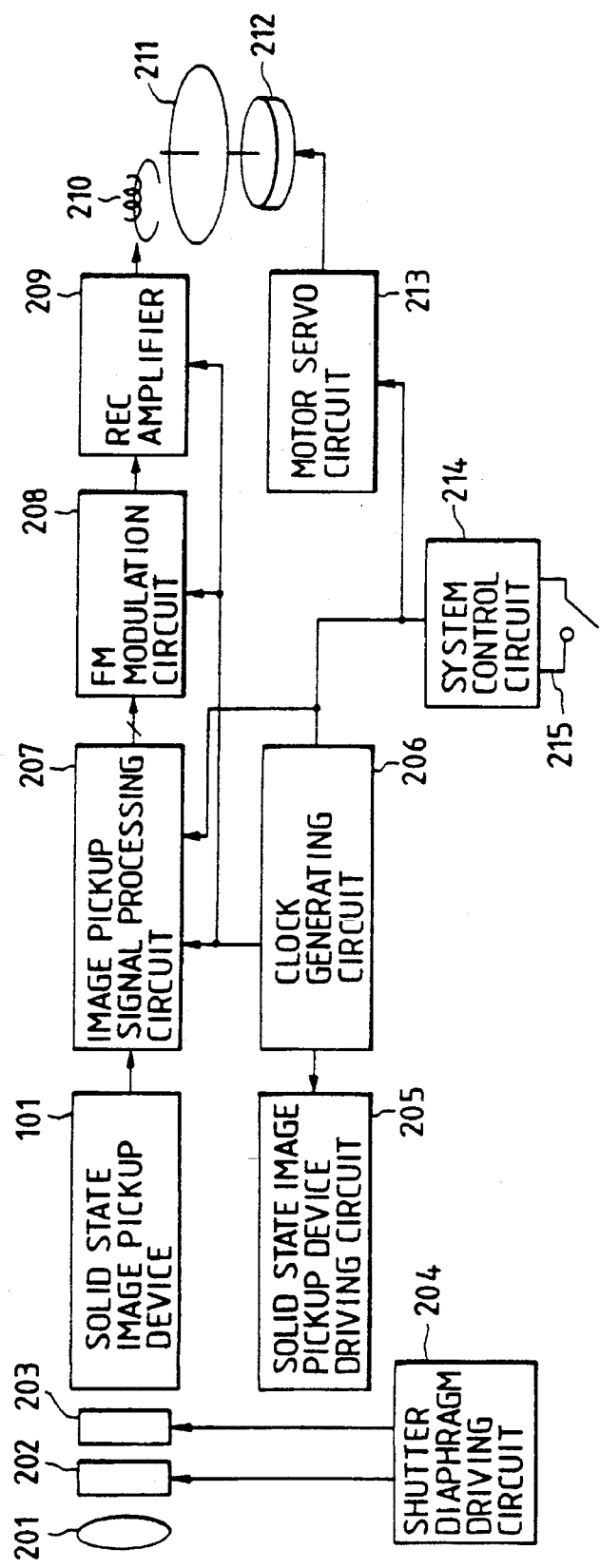
FIG. 5 is a block diagram of an electronic still camera.
Figure 7:
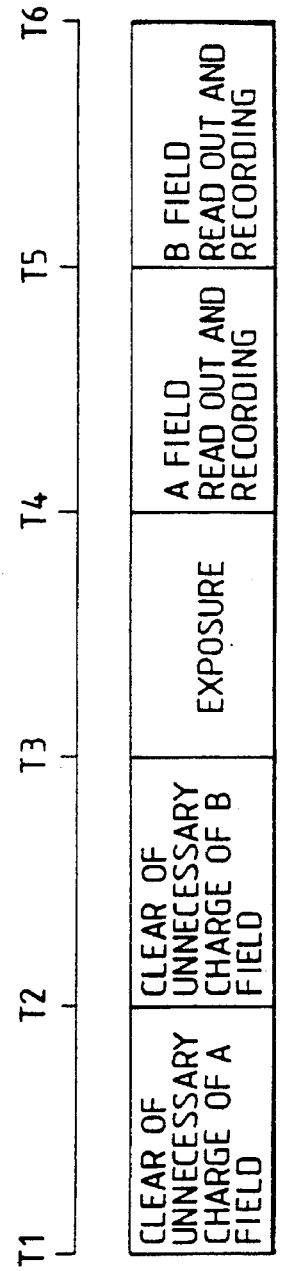
FIG. 7 illustrates a drive sequence for an electronic still camera.
Figure 6:
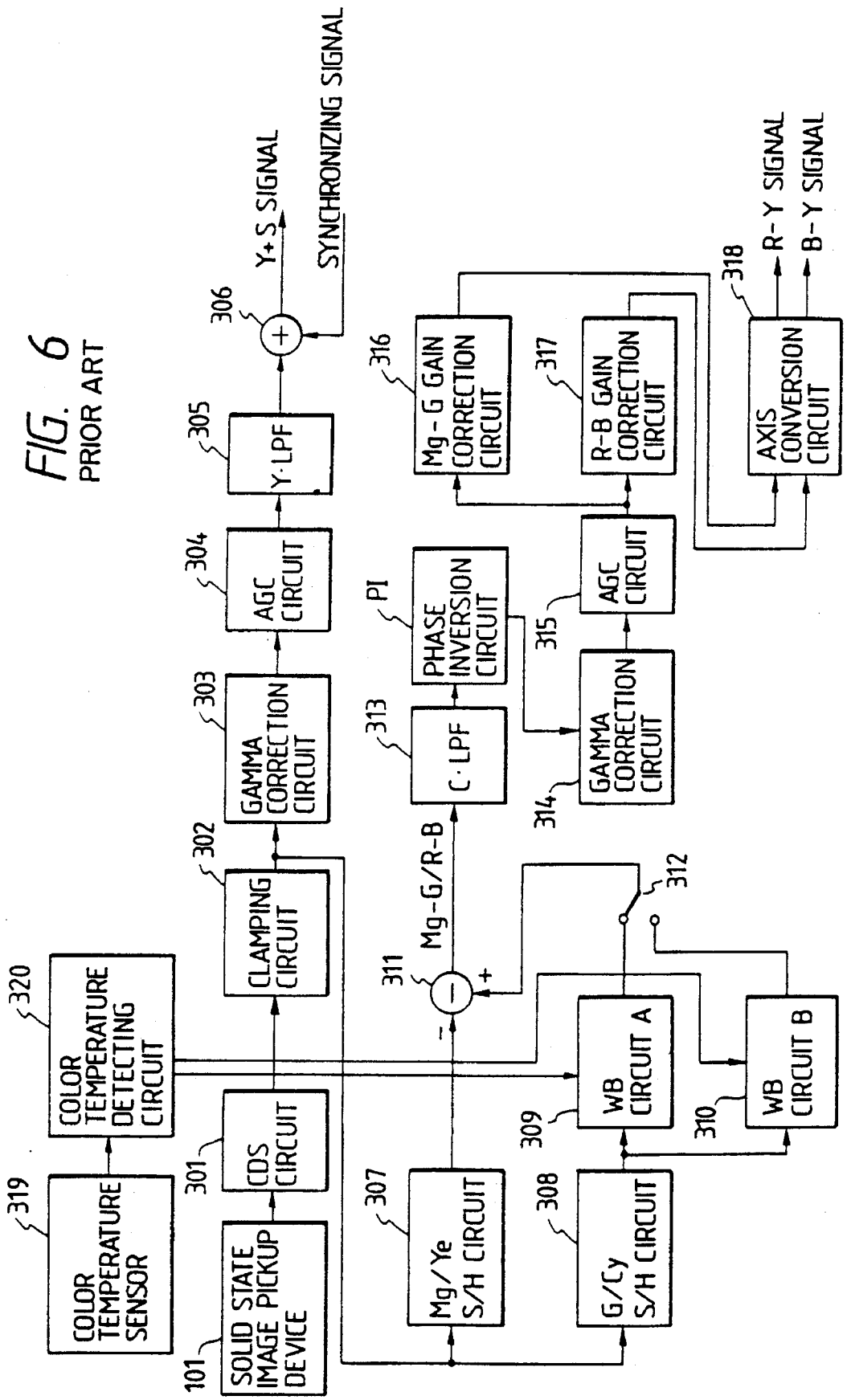
FIG. 6 is a block diagram of a conventional image pickup signal processing circuit 207.
Figure 8:
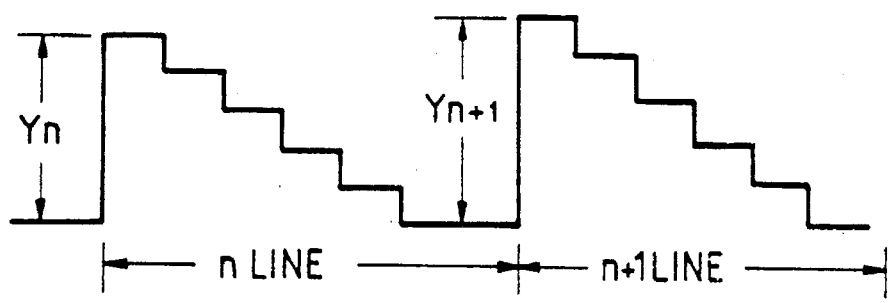
FIG. 8 illustrates a luminance step.

FIG. 13A illustrates the spectral characteristics of the color filters of FIG. 2, and FIG. 13B illustrates $D(\lambda)$. As will be seen from this, the portions A and B of FIG. 13B are cancelled, so that $Y_{2N} \approx Y_{2N+1}$ if the spectral reflectance $S(\lambda)$ of the subject is non-colored while if the subject is red and $S(\lambda)$ exists mainly in the portion A, $Y_{2N} < Y_{2N+1}$.

Conversely, if the subject is blue, the power of $S(\lambda)$ exists mainly in B, so that $Y_{2N+1} < Y_{2N}$. Therefore, it cannot be necessarily said that $Y_{2N+1} = Y_{2N}$ holds at all times only by multiplying one luminance by a uniformly.

If the spectral reflectance $S(\lambda)$ of the subject is known, an optimal correction to the luminance signal can be performed such that $Y_{2N} = Y_{2N+1}$.

For example, if $Y_{2N+1}$ is multiplied by a constant a, it is required that the following equation equals 0:

$$Y_{2N+1} - aY_{2N} = \frac{1}{2} \int_{\lambda_1}^{\lambda_2} S(\lambda)[Mg(\lambda) + Gr(\lambda) - a(Cy(\lambda) + Ye(\lambda))] \, d\lambda \quad (4)$$

Therefore, $$\int_{\lambda_1}^{\lambda_2} S(\lambda)[Mg(\lambda) + Gr(\lambda)] \, d\lambda = a \int_{\lambda_1}^{\lambda_2} S(\lambda)[Cy(\lambda) + Ye(\lambda)] \, d\lambda \quad (5)$$

Thus, $$a = \int_{\lambda_1}^{\lambda_2} S(\lambda)[Mg(\lambda) + Gr(\lambda)] \, d\lambda / \int_{\lambda_1}^{\lambda_2} S(\lambda)[Cy(\lambda) + Ye(\lambda)] \, d\lambda \quad (6)$$

If a is changed dynamically in accordance with $S(\lambda)$ as shown in the equation (6), the luminance step is completely eliminated in principle.

However, since it is difficult to know the spectral reflectance $S(\lambda)$ actually, processed color information (color signal) is used practically to correct the luminance step to thereby produce a similar effect.

FIG. 13C is a block diagram of an image signal processor of a video camera as a third embodiment of the present invention to realize such a principle. In FIG. 13C, reference numeral 401 denotes an image pickup device or sensor having the color filters of FIG. 2 attached thereto. The signal read from the sensor is input to a luminance step correcting portion 402 which multiplies the signal by a variable constant intermittently for every other horizontal scanning interval in accordance with a color signal as described later in more detail to provide a luminance signal free from the luminance step.

A luminance signal processing portion 403 performs necessary processings such as low pass filtering and γ-processing to provide a luminance signal Y finally. Of course, the order of arrangement of the luminance step correcting portion 402 and luminance signal processing portion 403 may be reversed.

The output from the sensor 401 is input to the color difference operating portion 404 which calculates a color difference signal (Mg–Gr) or (Cy–Ye) for each horizontal scanning interval to provide the signal. These color difference signals are subjected to white balancing or γ-conversion by the color difference processing portion 405. For example, white color may be balanced by adding and subtracting part of the luminance signal to and from the color signals such that a response to a white subject is nullified. Thereafter, the color difference signals obtained sequentially for each line are caused to coincide with each other using a one horizontal scanning interval delay line, for example, in a coincidence portion 406 and the resulting signals are appropriately added or subtracted in a color difference matrix portion 407 to rotate the color difference axis to provide two color difference signals R–Y, and B–Y, which are then outputted as they are and also inputted simultaneously to the luminance step correcting portion 402.

Figure 14:
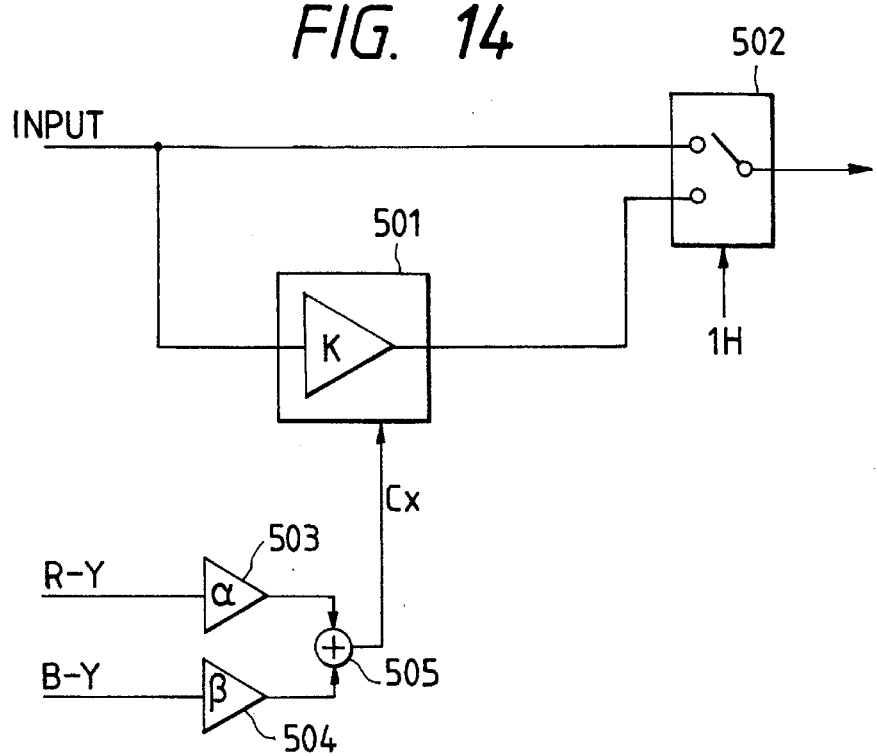
FIG. 14 is a block diagram of the luminance step correction portion of the third embodiment.

FIG. 14 shows the illustrative structure of the luminance step correcting portion 402 in FIG. 13C. The output from the sensor 401 is inputted to one input of switch 502 and to a variable constant multiplier 501. The multiplier 501 is controlled by an external control signal of DC voltage Cx which provides a multiplication factor K.

In the filter arrangement shown in FIG. 2, if the red component is strong, Mg+Gr is large while if the blue component is strong, Cy+Ye is large, so that it is preferable to convert the color difference signals to a one-axis one-dimensional signal corresponding to the axes of two-dimensional two-axis color signals R–Y and B–Y.

In FIG. 14, appropriate weights (α, β) are added (linearly combined) to color difference signals R–Y and B–Y by coefficient multipliers 503 and 504, respectively, to provide a one-axis control signal Cx. For example, when α=1, and β=–1, then Cx=R–B. If Cx increases, K also increases. Therefore, in the case of a scanning line corresponding to the (Mg+Gr) signal, the switch 502 selects an upper input as an output while in the case of a scanning line corresponding to the (Cy+Ye) signal, the switch 502 selects the lower input to provide (Mg+Gr)/K(Cy+Ye) alternately. Since K increases as the color of the subject moves toward red, so that no luminance step is produced in a wide-range colored object.

Figure 15:
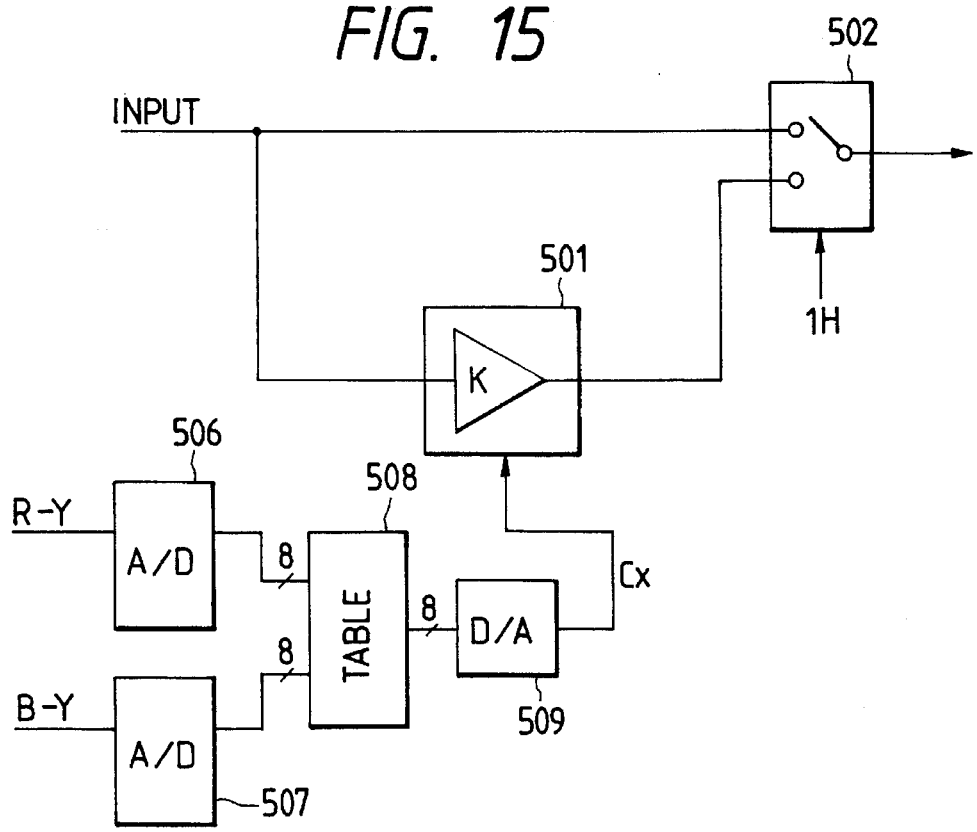
FIG. 15 is a block diagram of the luminance step correction portion of a fourth embodiment of the present invention.

A fourth embodiment of the present invention now will be described. The whole structure of the embodiment is as shown in FIG. 13C, and the luminance step correcting portion has the structure shown in FIG. 15.

In the one-axis control corresponding to the R–B axis of the third embodiment, the constant K in the variable constant multiplier 501 is controlled with a quantity of control corresponding to a point in a two-dimensional color difference space defined by two axis R–Y and B–Y if the step correction is insufficient.

In order to realize this process in the present embodiment, the color difference signals R–Y and B–Y are converted to 8-bit digital signals by the corresponding A/D converters 506 and 507, respectively. Digital data on control voltage Cx corresponding to an optimal multiplication constant value for a predetermined (Cy+Ye) is written at an address defined by those two 8-bit signals. Therefore, the control signal Cx corresponding to a point in the two-dimensional color difference space corresponding to the color difference signals R–Y and B–Y is obtained through a D/A converter 509. The control signal is used to control the variable coefficient multiplier 501 to correct the luminance signal intermittently for every other horizontal scanning interval to eliminate the luminance step even if the step correction is insufficient in the third embodiment.

The processing by the digital processing section in the particular embodiment may be performed slowly at an operational speed of 1M–500 KHz since the color band is narrow. The bit accuracy of the digital processing section may be equal to, or less than 8-bits in accordance with the operational speed and accuracy of the variable coefficient multiplier 501.

In the case of a subject such as a fluorescent lamp, having a spectral distribution containing a bright line, one-axis control such as that employed in the third embodiment is often not satisfactory. In such a case, the method used in the particular embodiment is effective.

While in the respective embodiments the luminance signal Y is intermittently multiplied by the factor of K for every other horizontal scanning interval to provide K·Y in which K is controlled by the color signal, K and B may be controlled in the form of K·Y+B by a color signal.

Of course, Mg, Gr, Cy and Ye may be converted temporarily to the primary colors R, G and B by calculation and the value of the constant K may be controlled by three-dimensional three-axis color signals R, G and B.

The arrangement of filters on the sensor 401 may be such that four color filters are disposed at positions of Mg, Gr, Cy and Ye of FIG. 2 or such that a luminance signal is formed from a different filter for each horizontal scanning interval as in a pure color mosaic of a G-stripe RB line sequential system. Of course, the order of arrangement of Gr, Mg in the second field may be reversed.

While in the respective embodiments the circuits are switched by the switch 502 for each horizontal scanning interval and the luminance signal is corrected intermittently for every other horizontal scanning interval, the luminance signal may, of course, be corrected for each horizontal scanning interval to eliminate the luminance step.

Since the above embodiments correct the luminance step in the horizontal scanning lines in accordance with the color signal, an image signal of high quality and free from luminance step can be obtained from a wide-range colored subject.

Figure 16:
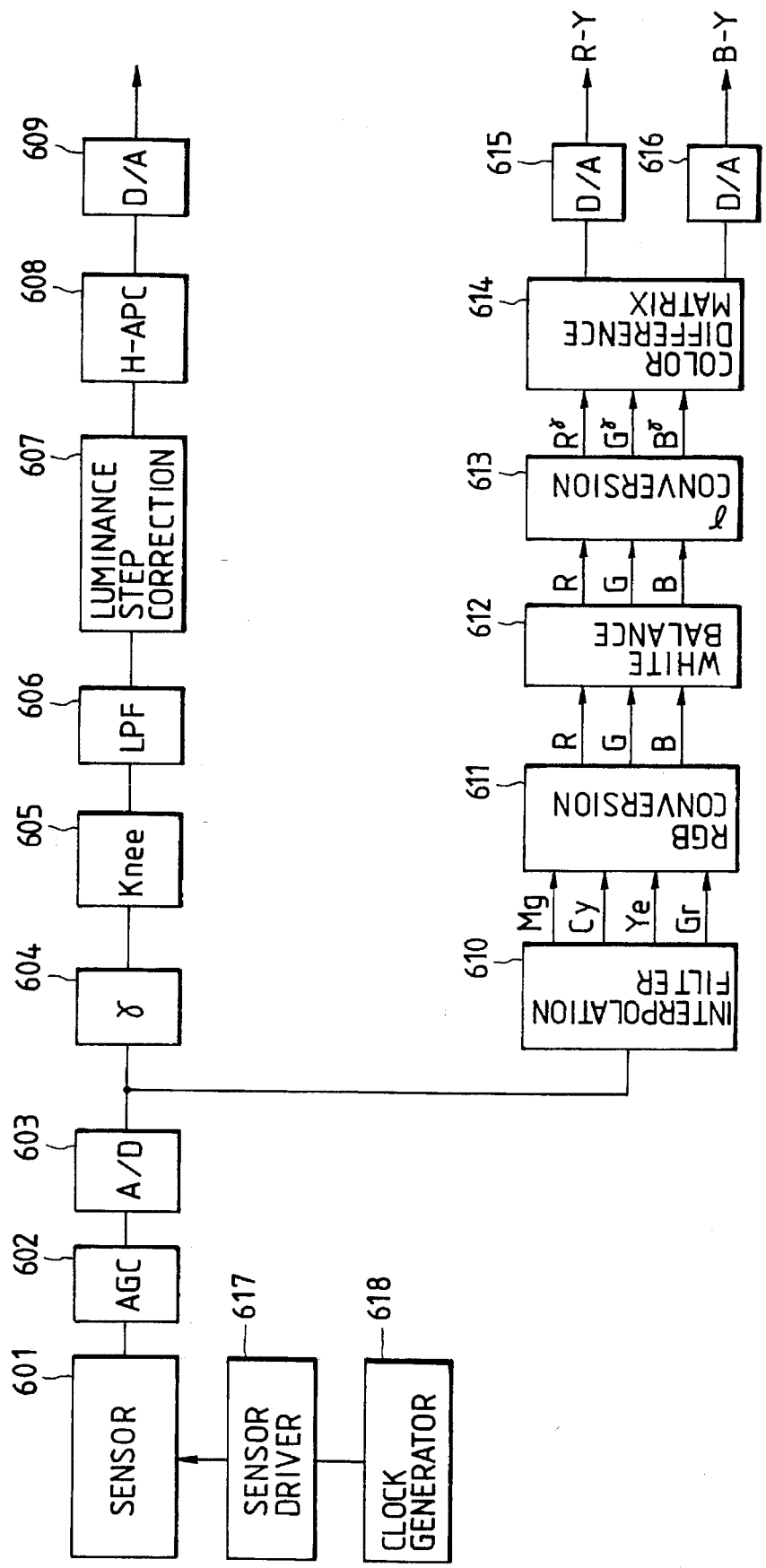
FIG. 16 is a block diagram of a fifth embodiment of the present invention.

FIG. 16 shows a fifth embodiment in which a CCD with color filters as shown in FIG. 2 is interlace-scanned. The CCD sensor 601 has four kinds of color filters as shown in FIG. 2. The image signal read for each pixel by interlace scanning from the sensor 601 is first adjusted in gain by an automatic gain controller 602 such that the respective signals exhibit the same response to white and are A/D converted by an A/D converter 603 at the timing synchronous with a read clock. For later color processing, the A/D converter 603 is preferably excellent in linear characteristics and preferably performs a converting operation using 8 bits or more from a standpoint of quantizing error.

FIG. 16 illustrates one example of color signal processing in which the output signal from the A/D converter 603 is inputted to an interpolation filter 610 to cause color signals Mg, Gr, Cy and Ye to coincide with each other using a delay line, for example. The resulting signals are then converted by an RGB converter 611 to R-, G-, and B- signals and the resulting signals are then balanced with reference to white by a white balancing unit 612. The output R-, G-, and B- signals from the white balancing unit 611 are γ-converted by a γ-converter 613 using table conversion. The resulting signals are then subjected to matrix operation by a color difference matrix 614 to provide color difference signals R–Y and Y–B. Finally, the respective color difference signals are D/A converted by a D/A converter 615 and outputted.

Figure 17:
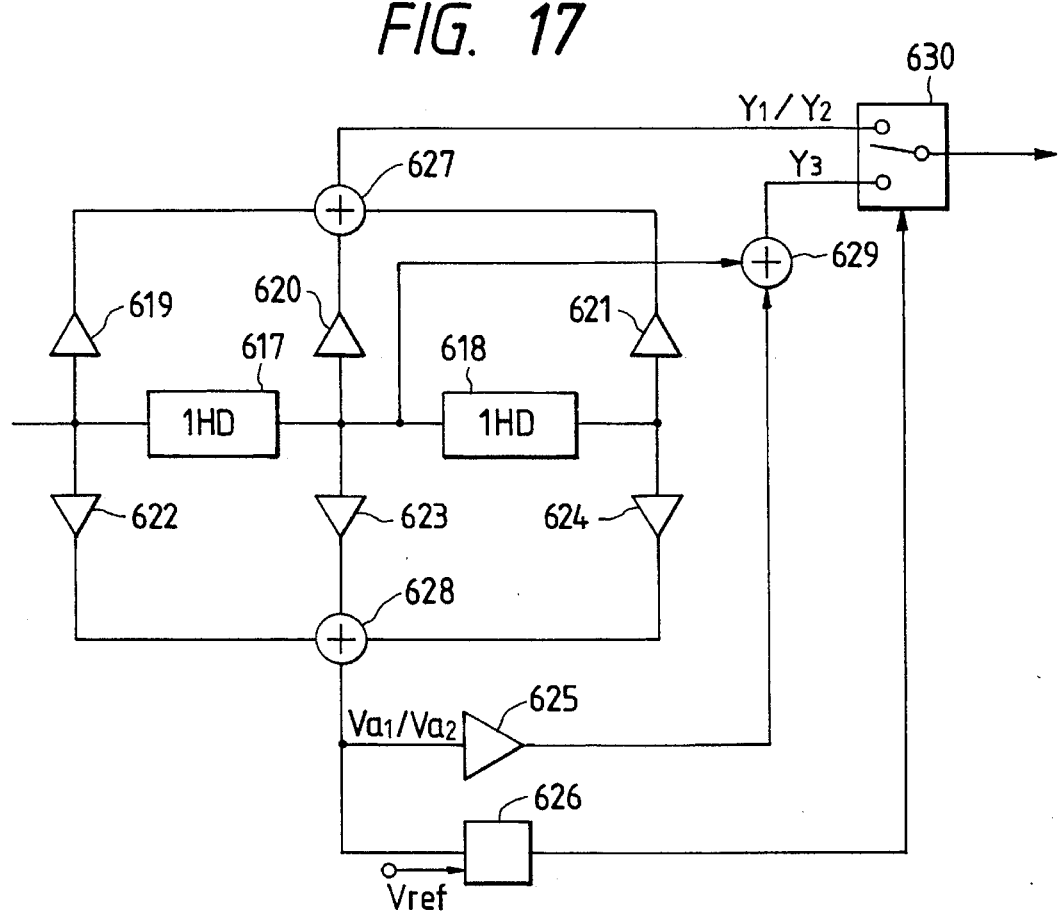
FIG. 17 is a block diagram of the luminance step correcting portion of the fifth embodiment.

The output from the A/D converter 603 is first inputted to γ-converter 604 for luminance signal processing. In the γ-converter 604, the γ-converted luminance signal is inputted to a Knee converter 605 for Knee conversion. The order of arrangement of the γ-converter 604 and Knee converter 605 may be reversed. The γ-converted and Knee-converted luminance signal is averaged with reference to its horizontal luminance signal component by a low pass filter 606 and the resulting signal is inputted to a luminance step correcting portion 607, which is constituted, for example, as shown in FIG. 17. The output from the correcting portion 607 includes a luminance signal impairing no original image information and free from a luminance step produced for each line. The example of FIG. 17 is also characterized by simultaneous correction of an aperture in the vertical direction.

The luminance step correcting portion of FIG. 17 will now be described. Assume that the output from the sensor 601 is interlace-scanned. If the color filter of FIG. 2 is used, the output from the A/D converter 603 is switched such that the (Mg/Gr) and (Cy/Ye) lines are alternately outputted for each horizontal scanning interval. Therefore, if the luminance signal is averaged in the horizontal direction by the low pass filter 606, the lines having luminance signals of about ½ (Mg+Gr) and about ½ (Cy+Ye) are outputted for each horizontal scanning interval, so that these two kinds of luminance signals are inputted to the luminance step correcting portion 607. The luminance step correcting portion of FIG. 17 mainly includes a vertical low pass filter which comprises one-horizontal scanning interval delay units 617 and 618, coefficient multipliers 619, 620 and 621, and an adder 627; a high pass filter mainly including one-horizontal scanning interval delay units 617 and 618, coefficient multipliers 622, 623 and 624, and an adder 628; a switch 630 for switching between the original luminance signal and the luminance signal averaged vertically by the low pass filter in accordance with a V-APC (vertical aperture) provided by high pass filtering. For example, if the coefficients for the coefficient multipliers 619 and 621 are set to ¼ and the coefficient for the coefficient multiplier 620 is set to ½, the adder 627 alternately outputs for each horizontal scanning interval a luminance signal $Y_1$=¼ (Mg+Gr+Cy+Ye) which comprises the average of luminance signals $Y_{Mg}$=½ (Mg+Gr) and $Y_{Cy}$=½ (Cy+Ye) before and after $Y_{Mg}$, and a luminance signal $Y_2$=¼ (Mg+Gr+Cy+Ye) which comprises the average of luminance signals $Y_{Cy}$=½(Cy+Ye) and $Y_{Mg}$=½(Mg+Gr) before and after $Y_{Cy}$. By such vertical low pass filtering, $Y_1$=$Y_2$ and the vertical luminance signals are averaged. If the coefficients for the coefficient multipliers 622 and 624 are set to –½, and the coefficient for the coefficient multiplier 623 is set to 1, the adder 628 alternately outputs for each horizontal scanning interval a V-APC signal of $V_{a1}$=½ (Mg+Gr–Cy–Ye) obtained by averaging luminance signals $Y_{Mg}$=½(Mg+Gr) and $Y_{Cy}$=½(Cy+Ye) before and after $Y_{Mg}$, and a signal V-APC of $V_{a2}$=½(Cy+Ye–Mg–Gr) obtained by averaging luminance signals $Y_{Cy}$=½ (Cy+Ye) and $Y_{Mg}$=½ (Mg+Gr) before and after $Y_{Cy}$.

The switch 630 receives the luminance signal $Y_1$ obtained by low pass filtering in the vertical direction and the luminance signal $Y_3$ obtained by emphasizing the configuration of the original luminance signal in the vertical direction. The switch is controlled by the output from the adder 628 obtained by high pass filtering, namely, the V-APC signal, such that the low pass filtered output $Y_1$ from the adder 627 is selected in a portion having many low frequency components and a noticeable luminance step and that the output $Y_3$ of the adder 629 in which its configuration is emphasized in the vertical direction is selected in a portion having many high frequency components and a luminance step not so noticeable. A quantity of high frequency components is easily determined, for example, by comparing a predetermined reference voltage Vref and the V-APC signal using a comparator 626.

In order to emphasize the configuration of the luminance signal in the vertical direction, the V-APC signal outputted by the adder 628 is required to be added to the original luminance signal by the adder 629 through coefficient multiplier 625. The use of a luminance signal the configuration of which is emphasized imparts a sensitivity of choice to a reproduced image. The degree of configuration emphasis in the vertical direction is easily set by controlling the V-APC signal by changing the coefficient for the coefficient multiplier 625 as required.

As described above, the luminance step of the luminance signal is corrected in step correcting portion 607 and the configuration of the luminance signal is emphasized in the vertical direction by the luminance step correcting portion 607. The horizontal configuration of the resulting signal from the luminance step correcting portion 607 is emphasized by 608 and, finally, the resulting signal is D/A converted by the D/A converter 609 and outputted.

Figure 18:
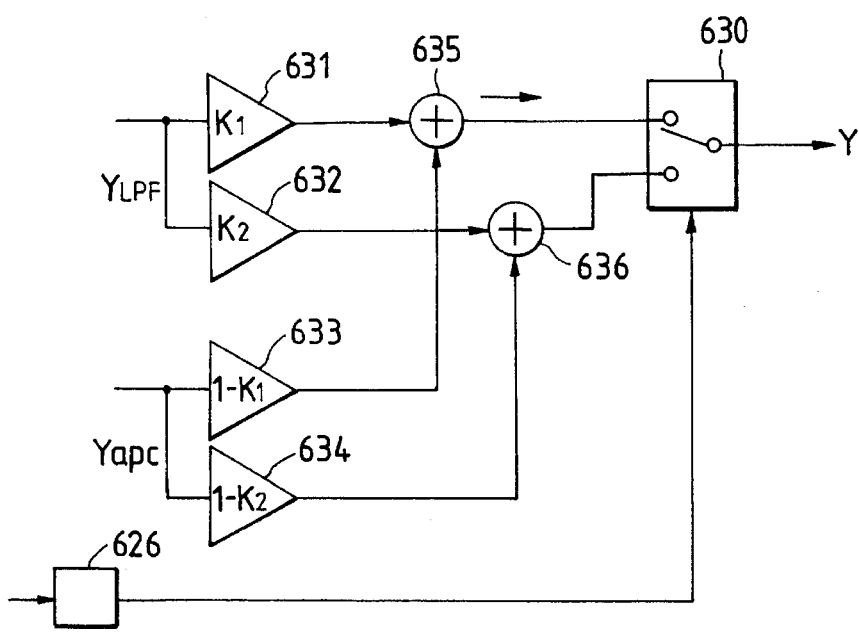
FIG. 18 is a block diagram of a sixth embodiment of the present invention.

The generation of a luminance signal using a structure shown in FIG. 18 is effective for the present invention. Therefore, a sixth embodiment in this case will be described. The embodiment of FIG. 18 adds at any ratio the output luminance signal from a vertical low pass filter and the original luminance signal or a version of the original luminance signal obtained by emphasis on the configuration of the original signal in the vertical direction. For example, the switch 630 can output a luminance signal $Y_1$=$K_1 Y_{LPF}$+(1–$K_1$)$Y_{apc}$ or $Y_2$=$K_2 Y_{LPF}$+(1–$K_2$)$Y_{apc}$ by setting the coefficients for the coefficient multipliers 631–634 to $K_1$, $K_2$, 1–$K_1$, 1–$K_2$ where $K_1$>$K_2$, $Y_{LPF}$ is the output from the adder 627 which comprises the output from the vertical low pass filter, and $Y_{apc}$ is the original luminance signal or a version of the original signal having its emphasized configuration and then by proper switching. Since the switch 631 is controlled by the V-APC signal comprising the output from the comparator 626 as in the fifth embodiment, the respective outputs from the adders 635 and 636 are selected the coefficients of which are set such that a large amount of $Y_{LPF}$ is contained if the image signal contains many low frequency components while the original luminance signal or a version of the original signal the vertical configuration of which is emphasized, namely, a large amount of $Y_{apc}$, is contained if the image signal contains many high frequency components. The number of coefficient multipliers is not required to be two for each of the adders 627 and 629 as shown in FIG. 18, and may be increased or decreased for each adder as required.

While the use of two one-horizontal scanning interval delays has been described above, the present invention is effective also in the use of one horizontal scanning interval delay and a frame memory because it has a luminance signal averaged in the vertical direction and the original luminance signal or a version of the original luminance signal having a configuration emphasized in the vertical direction and controlled by the V-APC signal to produce a luminance signal finally as in the fifth and sixth embodiments.

Figures 19, 20:
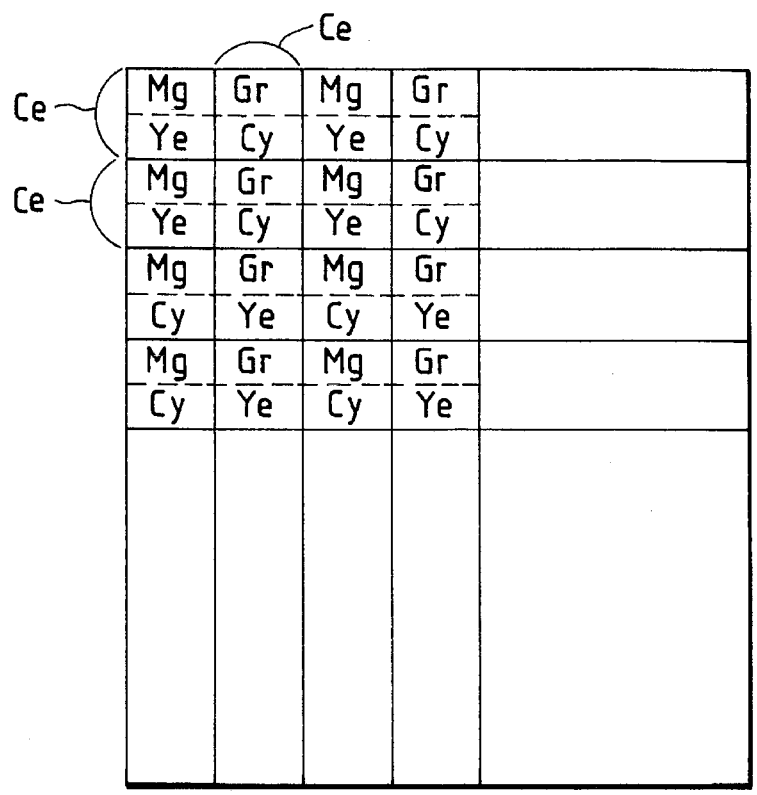
FIGS. 19 and 20 illustrate the arrangement of other color filters.

While the arrangement of the color filters shown in FIG. 2 has been described above as an example, the present invention is also effective if a luminance signal is produced from the sum of the color filters different which are for each horizontal scanning interval even if the filters are of the mosaic type shown in FIGS. 19 or 20 or of a pure color mosaic type such as G-stripe R/B line sequential type (in which G-filters are disposed in every other line in a stripe manner with R- and B-filters being disposed alternately in each line).

While in the above structure low pass filtering and configuration emphasis are effected digitally, they may be effected using analog circuits.

As described above, according to the fifth and sixth embodiments of the present invention, the original luminance signal and a vertically low pass filtered version of the original luminance signal are switched or added at any ratio and outputted in the low frequency area in which the luminance step is noticeable and in the high frequency area in which the luminance step is not so noticeable using the vertical configuration signal to thereby eliminate the luminance step without impairing the quality of the input image information.

Figure 21:
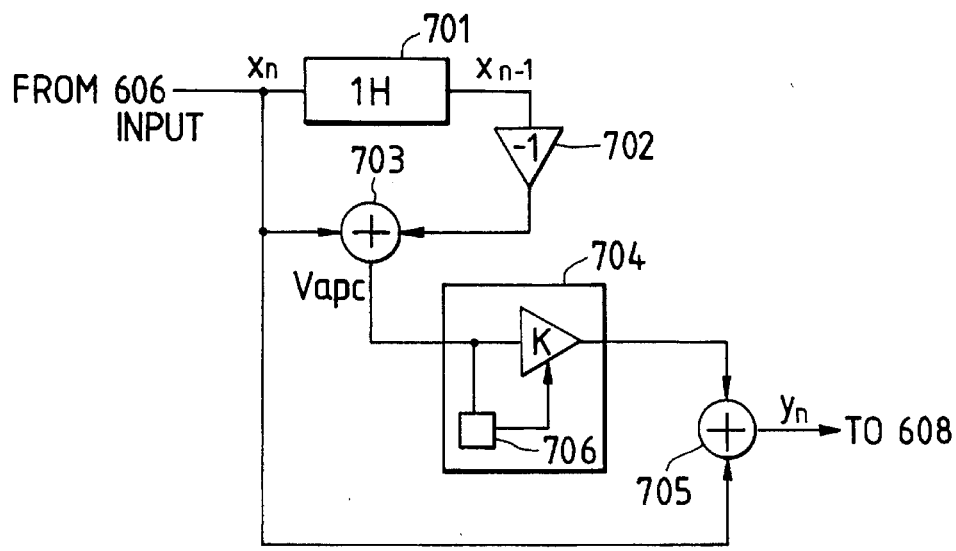
FIG. 21 illustrates the structure of a luminance step correcting portion of a seventh embodiment of the present invention.

FIG. 21 illustrates the structure of a luminance step correcting portion as a seventh embodiment which corresponds to the one shown by 607 in FIG. 16. An input signal includes a luminance signal containing a luminance step. If $x_n$ has been input to a one-horizontal scanning interval delay 701, the delay 701 outputs a signal $x_{n-1}$ preceding $X_n$ by one horizontal scanning interval. An inverter 702 inverts $x_{n-1}$, and the resulting signal is added to $x_n$ by an adder 703 to provide $x_n - x_{n-1}$ or a vertical aperture correction signal $V_{apc}$.

A non-linear processor 704 multiplies the input signal $V_{apc}$ by a gain K determined by a ROM 706 in accordance with the input signal and the resulting signal is added to the original signal $x_n$ by an adder 705.

The output from the adder 705 shown by $Y_n$ is given by $$y_n = x_n + K(x_n - x_{n-1})$$

If $K = -\frac{1}{2}$, then $$y_n = (x_n + x_{n-1})/2$$

Thus, the vertically low pass filtered output is obtained and the luminance step is eliminated.

If $K = 0$, then $Y_n = x_n$

At this time, the original signal is outputted as it is.

If $K = p$ (a positive constant), then $$y_n = x_n + p(x_n - x_{n-1})$$

In this case, the output includes a version of the original signal for which vertical aperture compensation is effected. Namely, K is used which is a function of $V_{apc}$. For example, since the luminance step is very noticeable in a vertically flat portion of a subject where the absolute value of the $V_{apc}$ signal is small, it must be eliminated. In this case, since the subject may be blurred slightly vertically, K is required to be set to $-\frac{1}{2}$.

Since the luminance step is not noticeable in a portion of the subject where vertical changes are frequent and large, namely, where the absolute value of the signal $V_{apc}$ is large, K is require to be set to 0 or p.

Figure 22A:
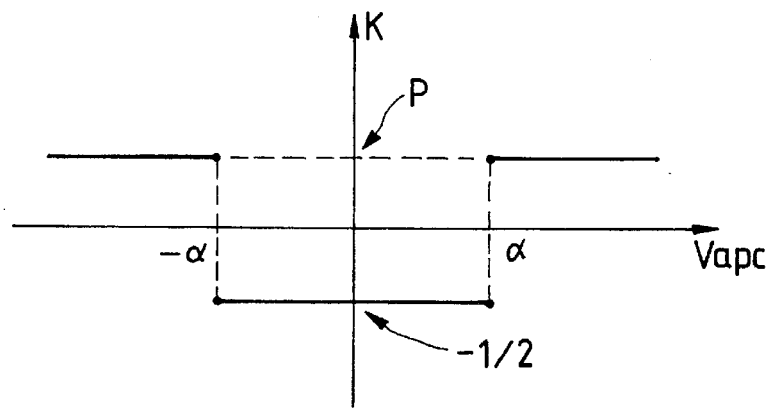
FIGS. 22A and 22B illustrates the non-linear processing by the seventh embodiment.
Figure 22B:
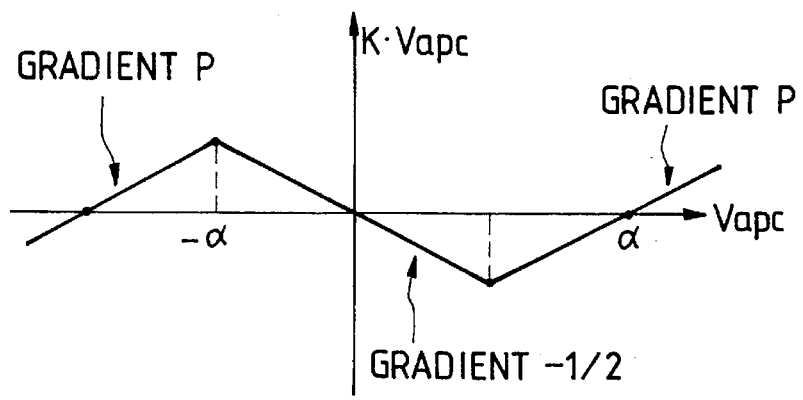

Therefore, a change in K and a change in $K \cdot V_{apc}$ caused by an input $V_{apc}$ when a particular reference value α is used as a threshold are required to be set as shown in FIGS. 22A and 22B. The graph of FIG. 22B is obtained by integrating that of FIG. 22A.

Therefore, the input/output characteristic of a non-linear processor 704 of FIG. 21 is required to be set as shown in FIG. 22B. This is a non-linear conversion between an one-input and an one-output, so that corresponding data may be stored beforehand in ROM 706 for table conversion.

The luminance signal in which the luminance step correction and vertical configuration emphasis are effected by the luminance step correcting portion 607 is emphasized with respect to horizontal configuration by 608 of FIG. 16, and the resulting signal is finally D/A converted by a D/A converter 609 and outputted.

(Eighth Embodiment)

Figure 23:
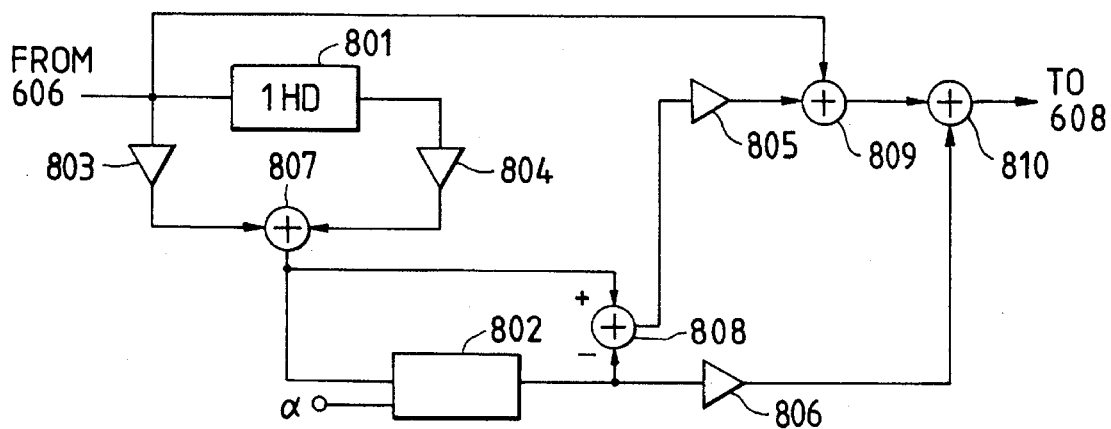
FIG. 23 is a block diagram of an eighth embodiment of the luminance step correcting portion.

The luminance step correction portion 607 of FIG. 16 may be replaced with an eighth embodiment of FIG. 23. Assuming that the output from sensor 601 is interlace-scanned, if, for example, the color filters of FIG. 2 are used, the output from the A/D converter 603 is switched such that the outputs of a (Mg/Gr) line and a (Cy/Ye) line are alternately provided for each horizontal scanning interval. Therefore, if the luminance signal is averaged horizontally by low pass filter 606, a line having a luminance signal of about ½ (Mg+Gr) and a line having a luminance signal of about ½ (Cy+Ye) are outputted alternately for each horizontal scanning interval. Therefore, these two kinds of luminance signals are input to the luminance step correcting portion 607.

The luminance step correcting portion of FIG. 23 includes a high pass filter which comprises a one-horizontal scanning interval delay 801, coefficient multipliers 803, 804 and an adder 807; a non-linear processor 802 which extracts large-amplitude high-frequency components of a vertical aperture (V-APC) signal obtained by high pass filtering; and a luminance step correcting signal generator which comprises a subtractor 808 and a coefficient multiplier 805.

For example, if coefficients for the coefficient multipliers 803 and 804 are set to 1 and −1, respectively, the adder 807 alternately outputs for each horizontal scanning interval a V-APC signal of $V_{a1} = (Mg+Gr-Cy-Ye)$ obtained from a luminance signal $Y_{Mg} = ½ (Mg+Gr)$ and a luminance signal $Y_{Cy} = ½ (Cy+Ye)$ preceding $Y_{Mg}$ by one horizontal interval and a V-APC signal of $V_{a2} = ½ (Cy+Ye-Mg-Gr)$ obtained from a luminance signal $Y_{Cy} = ½ (Cy+Ye)$ and a luminance signal $Y_{Mg} = ½ (Mg+Gr)$ preceding $Y_{Cy}$ by one horizontal interval. Since the V-APC signal outputted by the adder 807 includes high frequency components of large and smaller amplitudes, only large amplitude components of the V-APC signal can be obtained at the output of the non-linear processor 802 by imparting to same a characteristic to extract only the large amplitude components of the V-APC signal (for example, a characteristic as shown that in FIG. 24). Smaller amplitude components of the V-APC signal are obtained by taking the difference between the V-APC signal which has not been subjected to non-linear processing and a version of the V-APC signal which has been subjected to non-linear processing. Assume now that a subject is vertically flat, for example, like a wall. Since the luminance step in this case is very noticeable, it must be corrected.

The luminance step, namely, the difference between (Mg+Gr) and (Cy+Ye), is outputted as the V-APC signal from the adder 807. Since the V-APC signal due to the luminance step is small in amplitude, the output from the non-linear processor 802 is substantially null and outputted as it is to the subtractor 808.

Therefore, if, for example, the input to the 1H delay 801 is (Mg+Gr), the output from the adder 808 is (Mg+Gr)−(Cy+Ye). If this signal is multiplied by a factor of −½ by the coefficient multiplier 805, and the resulting signal is added to the original signal by the adder 809, the output is given by $$Y = (Mg + Gr) + (-1/2)[(Mg + Gr) - (Cy + Ye)]$$
$$= 1/2 (Mg + Gr + Cy + Ye)$$

Since this output also takes the same form for the next horizontal scanning interval, the luminance step is eliminated. The output from the non-linear processor 802 is substantially zero, so that the adder 810 does not do substantially anything.

Conversely, if a subject itself contains many vertically changing components, the luminance step is not so noticeable, if at all, so that the vertical configuration is desired to be emphasized. In order to perform configuration emphasis in this case, the V-APC signal outputted from the non-linear processor 802 is required to be added in the adder 810 to the luminance signal outputted from the adder 809 via the coefficient multiplier 806. In this case, the V-APC component due to the luminance step is shut out by the non-linear processor 802 because the V-APC component has a small amplitude while the V-APC signal based on a necessary subject passes because it has a large amplitude. The use of the luminance signal the configuration of which is emphasized brings about a reproduced image having a sensitivity of choice. The degree of vertical configuration emphasis can be easily set by changing the coefficient for the coefficient multiplier 806 as needed to control the V-APC signal.

Figure 24:
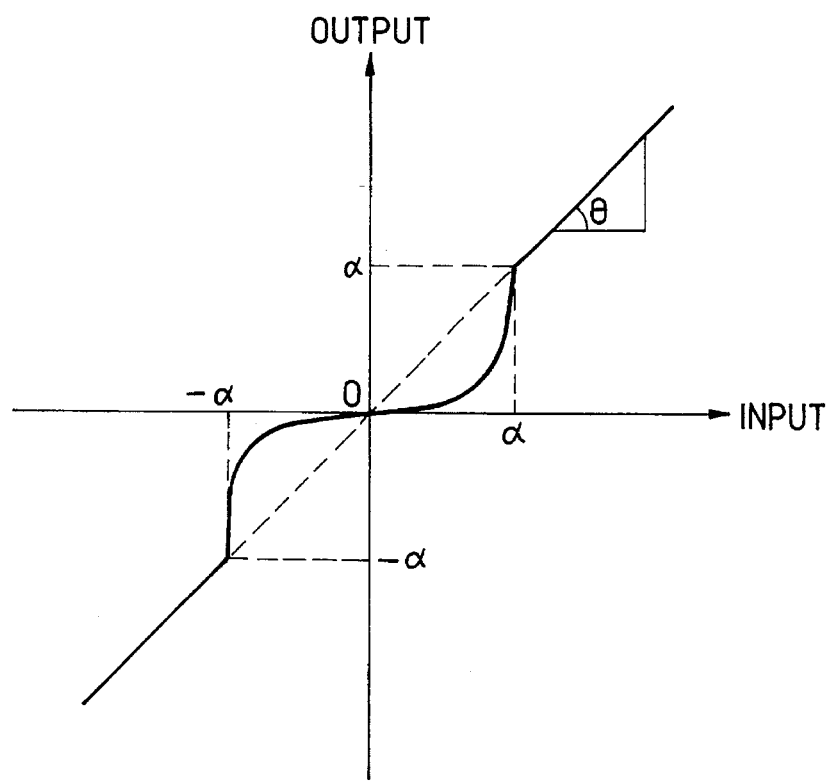
FIG. 24 illustrates one example of non-linear characteristics of the eighth embodiment.

In the characteristic diagram of FIG. 24, α is a reference value, a gradient angle θ meets tan θ=1. Namely,
Y=X for |X|>α
f(x) for |X|<α

The characteristic of the non-linear processor is not converted when the magnitude of the V-APC signal is basically larger than the reference value α, but it is represented by a non-linear characteristic, for example, of a cubic curve which decreases the V-APC signal when the magnitude of the V-APC is smaller than α. Therefore, the characteristic is required to be written into ROM and to be subjected to table conversion. Of course, the following may be set:

$$f(x)=0 \text{ for } x<|\alpha|$$

In this case, since the output from the subtractor 808 is the difference between that of FIG. 24 and the original signal, the value obtained by multiplying the output from the subtractor 808 by a coefficient of −½ in a coefficient multiplier 805 is substantially equal to the value of the graph of FIG. 22B where p=0.

Similarly, the output from 810 is the same as that obtained by setting p to the coefficient for a coefficient multiplier 806. Therefore, the particular embodiment produces an effect similar to that which the previous embodiment produces.

Figure 25:
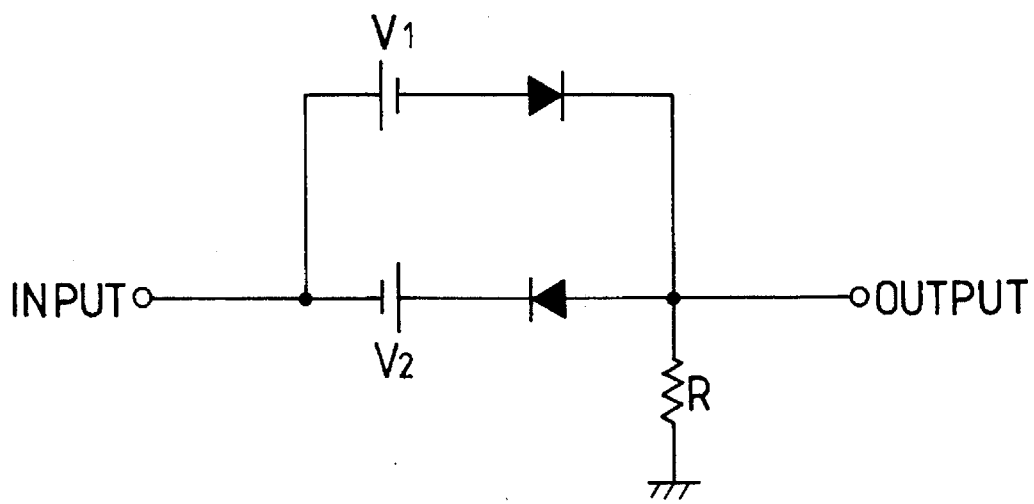
FIG. 25 illustrates an embodiment of a non-linear processing circuit of a ninth embodiment.
Figure 26:
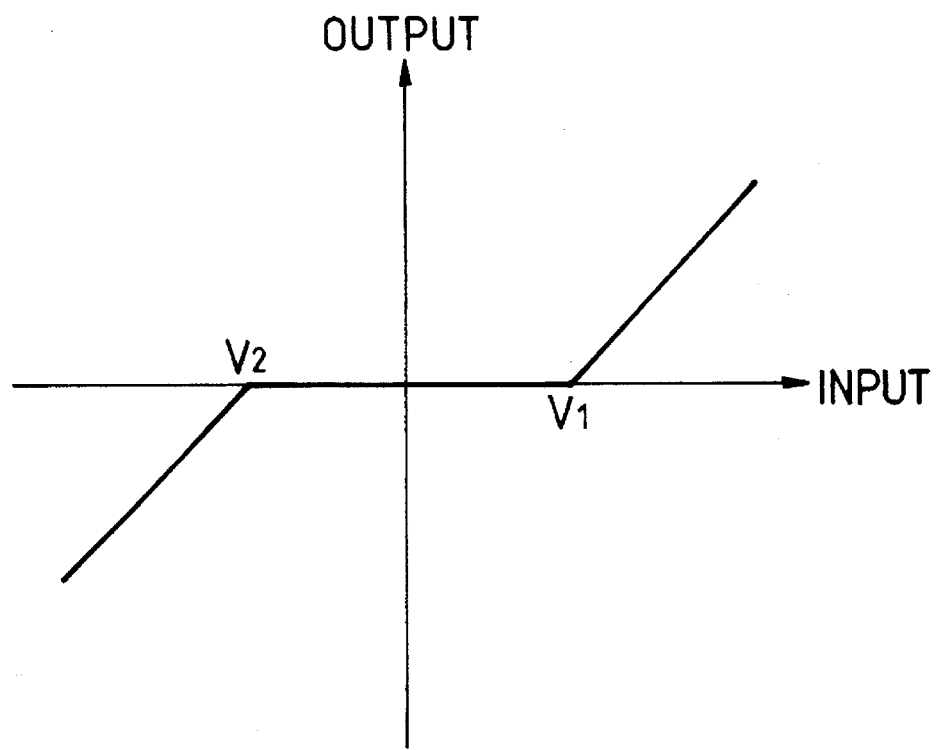
FIG. 26 is a characteristic diagram of the non-linear processing circuit of FIG. 25.

In the ninth embodiment, the luminance step correction unit may be constituted by an analog circuit. In that case, a clip circuit of FIG. 25 having the characteristic of FIG. 26 which uses a non-linear characteristic of a diode may be used as the non-linear processor 802 of the eighth embodiment to obtain a large amplitude component of a V-APC signal as in the eighth embodiment to form a correcting signal for the luminance step.

So-called base clipping may be used by inputting a V-APC signal to the base of a transistor, of course.

While in the above description the use of a single one-horizontal scanning interval delay has been described, two such delays, a frame memory and a non-linear processor may be used to process a V-APC signal in a non-linear manner and to add the resulting signal to the original signal to eliminate the luminance step.

As described above, the use of the method of performing a non-linear operation on a vertical aperture signal serves of facilitate correction to the luminance step in a portion containing many small amplitude components of the V-APC signal in which the luminance step is likely to be noticeable and a portion containing many large components of the V-APC signal in which the luminance step is likely to be not relatively noticeable.

Therefore, according to the embodiments of the present invention, the luminance step is eliminated without impairing the image quality of input image information.

What is claimed is:

1. A solid state image pickup apparatus in which a luminance signal is obtained from an average value of outputs of two or more pixels whose spectral characteristics are different from line to line, comprising:

correcting circuitry for correcting the amplitude of the luminance signal every other line according to the different spectral characteristics such that the corrected amplitude and the uncorrected amplitude of the luminance signal provide a constant amplitude of a luminance signal obtained from an image having a uniform luminance object.

2. A solid state image pickup apparatus according to claim 1, wherein said correcting circuitry comprises amplification means and switch means, and wherein said switch means alternately outputs for each line an input to said amplification means or an output of said amplification means.

3. A solid state image pickup apparatus according to claim 1, further comprising clamp means for clamping a predetermined portion of an output signal of said correcting circuitry at a predetermined level.

4. A solid state image pickup apparatus comprising:

means for providing luminance signals by combining outputs of a plurality of pixels whose spectral characteristics differ from line to line; and correcting means for selectively correcting amplitude of the luminance signals of different lines provided by said providing means so that the corrected amplitude at one line and the uncorrected amplitude at another line of the luminance signals provide a constant amplitude of a luminance signal obtained from an image having a uniform luminance object.

5. An apparatus according to claim 4, wherein the plurality of pixels include at least magenta and green.

6. An apparatus according to claim 4, wherein the plurality of pixels include at least yellow and cyan.

7. An apparatus according to claim 4, wherein said providing means provides the luminance signal of one line from a combination of signals of the pixels of magenta and green and provides the luminance signal of another line from a combination of signals of the pixels of yellow and cyan.

8. An apparatus according to claim 4, further comprising detection means for detecting a color state of an object.

9. An apparatus according to claim 8, wherein said correcting means performs a correction operation according to an output of said detection means.

10. An apparatus according to claim 8, wherein said detection means includes means for detecting the color temperature of the object.

11. An apparatus according to claim 8, wherein said detection means includes means for detecting the state of a color signal provided from an image pickup device.

12. An apparatus according to claim 11, wherein said detection means includes means for detecting the state of a color difference signal provided by the image pickup device.

13. An apparatus according to claim 12, wherein said detection means detects a combination output of the image pickup device of a plurality of color difference signals.

14. An apparatus according to claim 4, wherein said correcting means includes an amplifier.

15. A solid state image pickup apparatus comprising:
   means for providing luminance signals by combining outputs of a plurality of pixels whose spectral characteristics differ from line to line; and
   compensating means for selectively compensating amplitude of the luminance signals of different lines provided by said providing means so that the compensated amplitude at one line and the uncompensated amplitude at another line of the luminance signals provide a constant amplitude of a luminance signal obtained from an image having a uniform luminance object.

16. An apparatus according to claim 15, wherein the plurality of pixels include at least magenta and green.

17. An apparatus according to claim 15, wherein the plurality of pixels include at least yellow and cyan.

18. An apparatus according to claim 15, wherein said providing means provides the luminance signal of one line from a combination of signals of the pixels of magenta and green and provides the luminance signal of another line from a combination of signals of the pixels of yellow and cyan.

19. An apparatus according to claim 15, further comprising detection means for detecting the color state of an object.

20. An apparatus according to claim 19, wherein said compensating means performs a compensation operation according to an output of said detection means.

21. An apparatus according to claim 19, wherein said detection means includes means for detecting the color temperature of the object.

22. An apparatus according to claim 19, wherein said detection means includes means for detecting the state of a color signal provided from an image pickup device.

23. An apparatus according to claim 22, wherein said detection means includes means for detecting the state of a color difference signal obtained from the image pickup device.

24. An apparatus according to claim 23, wherein said detection means detects a combination output of the image pickup device of a plurality of color difference signals.

25. An apparatus according to claim 15, wherein said compensating means includes an amplifier.

* * * * *

UNITED STATES PATENT AND TRADEMARK OFFICE
CERTIFICATE OF CORRECTION

PATENT NO. : 5,583,568

DATED : December 10, 1996

INVENTOR(S) : Akira Suga et al.

Page 1 of 3

It is certified that error appears in the above-identified patent and that said Letters Patent is hereby corrected as shown below:

On the title page:

AT [30] FOREIGN APPLICATION PRIORITY DATA
"Nov. 20, 1988 [JP] Japan ... 63-322584" should read --Dec. 20, 1988 [JP] Japan ... 63-322584--.

SHEET 16, FIG. 23
At reference numeral 808, "$^+_-\oplus$" should be --$^+_-\odot$--.

COLUMN 1
Line 28, "a" should be deleted.
Line 29, "terminals" should read --terminal--.
Line 32, "terminals" should read --terminal--.
Line 42, "VOUT" should read --Vout--.

COLUMN 2
Line 1, "diaphram." should read --diaphragm.--
Line 25, "referred" should read --referred to--.

COLUMN 5
Line 2, "and" should be deleted.
Line 27, "illustrates" should read --illustrate--.
Line 64, "luminance 4" should read --numeral 4--.

COLUMN 6
Line 11, "is" should read --are--.
Line 19, "there" should read --their--.

UNITED STATES PATENT AND TRADEMARK OFFICE
CERTIFICATE OF CORRECTION

PATENT NO. : 5,583,568

DATED : December 10, 1996

INVENTOR(S): Akira Suga et al.

It is certified that error appears in the above-identified patent and that said Letters Patent is hereby corrected as shown below:

COLUMN 8
  Line 12, "axis" should read --axes--.

COLUMN 11
  Line 24, "different which are" should read --which are different--.
  Line 67, "$Y_a = X_a$" should be --$y_n = x_n$--.

COLUMN 12
  Line 16, "require" should read --required--.
  Line 24, "an" should read --a--.
  Line 25, "an" should read --a--.
  Line 56, "subtractor 808" should read --subtracter 808--.

COLUMN 13
  Line 18, "subtractor 808." should read --subtracter 808.--.
  Line 20, "adder 808" should read --subtracter 808--.
  Line 64, "$x<|\alpha|$" should read --$X<|\alpha|$--.
  Line 66, "subtractor 808" should read --subtracter 808--.

COLUMN 14
  Line 2, "subtractor 808" should read --subtracter 808--.
  Line 5, "810" should read --adder 810--.
  Line 25 "of" should read --to--.

UNITED STATES PATENT AND TRADEMARK OFFICE
CERTIFICATE OF CORRECTION

PATENT NO. : 5,583,568

DATED : December 10, 1996

INVENTOR(S) : Akira Suga et al.

It is certified that error appears in the above-identified patent and that said Letters Patent is hereby corrected as shown below:

<u>COLUMN 14</u>
  Line 26, "to" should read --of--.

Signed and Sealed this

Seventeenth Day of June, 1997

Attest:

BRUCE LEHMAN

*Attesting Officer*   *Commissioner of Patents and Trademarks*